United States Patent Office 3,620,144
Patented Nov. 16, 1971

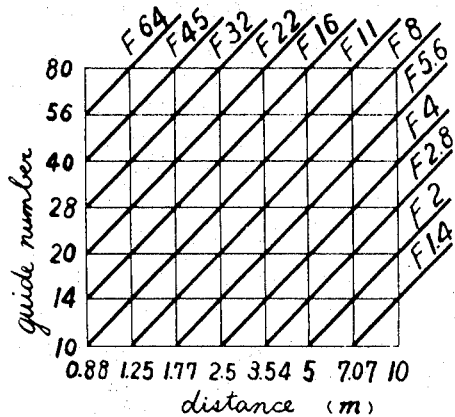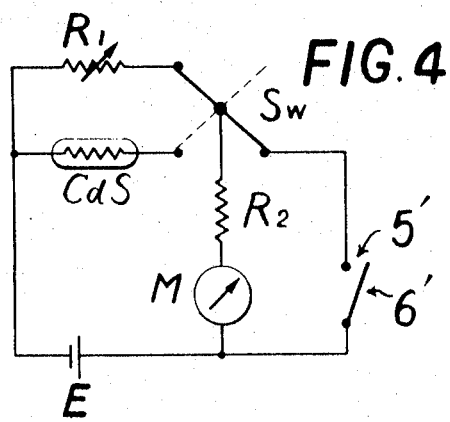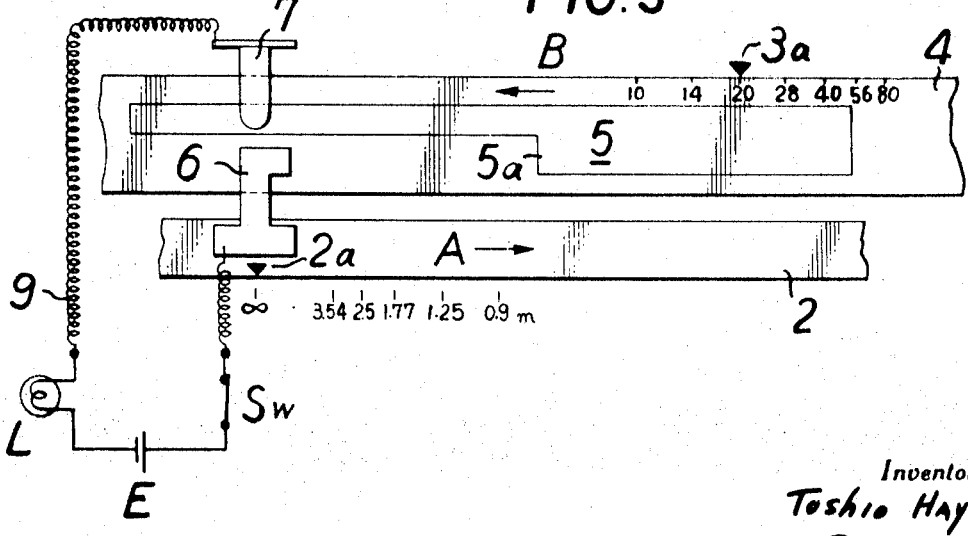

3,620,144
SYSTEM FOR INDICATING THE DISTANCE LIMIT FOR FLASH PHOTOGRAPHY
Toshio Hayashi, Osaka, Japan, assignor to Minolta Camera Kabushiki Kaisha, Osaka, Japan
Filed Oct. 29, 1969, Ser. No. 870,690
Claims priority, application Japan, Oct. 30, 1968, 43/79,469
Int. Cl. G03b 17/20
U.S. Cl. 95—11 R    4 Claims

ABSTRACT OF THE DISCLOSURE

A system for indicating distance limits to flash photography which comprises an electrically conductive surface provided on a guide number changing member of the camera and a contact attached to a distance adjusting member and disposed in mating relationship with the conductive surface. During operation of the guide number changing member and distance adjusting member, the distance between the conductive surface and the contact is varied. The contact and conductive surface are brought into engagement with each other to close the electric circuit of an electrical member for indicating a warning when the distance limit of proper exposure for flash photography has been reached.

BACKGROUND OF THE INVENTION

The present invention relates to a system for indicating the distance limit for flash photography, more particularly to a system for electrically indicating the limit of distance to the subject for flash photography which is determined by the light amount of a flashbulb and the diaphragm aperture that can be set on the camera.

In flash photography there is a limitation on the diaphragm aperture of the camera in that the minimum aperture, for instance, can not be reduced smaller than F/22 (on the other hand the maximum aperture has a limit, for example, of F/1.4, F/1.2 or the like), while depending upon the amount of the flash light and the distance to the subject, the aperture setting value may exceed the adjustable range of the diaphragm opening, so that in such cases it is impossible to make the adjustment of the diaphragm aperture and an appropriate amount of exposure can no longer can be obtained for taking a photograph. On these occasions, therefore, it is desired that a warning be given by some appropriate means to indicate that the diaphragm aperture is unadjustable.

Suppose the guide members are given by a sequence starting with the first term of 10 and having the common ratio of $\sqrt{2}$ and the diaphragm aperture values are given by F numbers based upon a sequence having the common ratio of $\sqrt{2}$ and starting with 1, the guide numbers are represented as follows:

Guide number = $F$ number × distance (in meter)    (1)

FIG. 1 presents this relationship in the distance range of 0.88 m. to 10 m. However, the minimum diaphragm aperture of lens on the camera is generally in the order of F/22 and the guide number ranges from 10 to 80 for practical use in case where the distance is given in meter. As apparent from FIG. 1, when the diaphragm is stopped down to the minimum aperture of F/22, the distance limits for the respective guide numbers given by the Equation 1 are:

| Guide numbers: | Distance limits, m. |
|---|---|
| 80 | 3.54 |
| 56 | 2.5 |
| 40 | 1.77 |
| 28 | 1.25 |
| 20 | 0.88 |

If the distance to the subject is less than 1.25 m. at the guide number of 28, the diaphragm can not be stopped down further beyond F/22, so that there arises a need to given some warning when the distance limit within the adjustable range of the diaphragm aperture is exceeded. Supposing that the minimum diaphragm aperture is F/22 with the minimum adjustable distance of 0.9 m., there is a need to make warnings approximately at 1.25 m. if the guide number of 28 is selected, at 1.77 m. for the guide number of 40, at 2.5 m. for 56, and at 3.54 m. for 80 respectively.

As means for making such warning, heretofore known are: a system to indicate the distance limit by a stopper; system to provide the indication of the diaphragm aperture limit with a lamp, exposure meter, or the like. However, the devices so far proposed are all extremely complex and unfit for practical use because a number of operating members have to be built in the camera.

SUMMARY OF THE INVENTION

An object of the present invention is to provide a system for indicating the distance limit for flash photography which directly utilizes the movement of a guide number changing member and a distance adjusting member and by which the distance limit can be detected and indicated electrically with high reliability.

Another object of the present invention is to provide a system with the features described which is extremely simple in structure and advantageous to construct and assemble.

Still another object of the present invention is to provide a system of the above-mentioned type in which, instead of providing a particular indicating member, an ordinary exposure meter built in the camera is utilized as the indicating means, the exposure meter being adapted for this purpose only by switching its electric circuit.

The present invention comprises an electrically conductive surface and a contact in mating relationship therewith, the conductive surface being provided on one of a guide number changing member and a distance adjusting member which are adapted to be rotated or moved respectively by separate operating portions, the contact being provided on the other of the members. Thus, the conductive surface and the contact form a switch mechanism adapted to open or close its contacting points in the vicinity of the distant limit of flash photography so as to provide a system for indicating the distance limit which operates reliably by directly utilizing the movement of the guide number changing member and the distance adjusting member. By lead wires the conductive surface and the contact are respectively connected to a power source and to an indication member such as a lamp. The indicating system of this invention is formed of such an extremely simple structure.

Since the guide number changing member and the distance adjusting member are included in any of the cameras of this type provided with devices for flash photography, the present system for indicating the distance limit of flash photography can readily be provided simply by incorporating a minimum number of simple and small members such as the conductive surface, contact member and lead wires for connecting them to power source and to warning indication member (e.g. lamp or exposure meter). Accordingly, the present invention is advantageous in that it permits versatile designs and is extremely easy to construct and assemble.

Furthermore, the exposure meter, when employed, requires no complex members because it is also built in the camera usually. In this case, the circuit of the exposure meter has only to be provided with a change-over switch for interchanging the usual exposure measuring operation with the operation for flash photography.

BRIEF DESCRIPTION OF THE DRAWING

FIG. 1 is a diagram showing the relationship between the guide number and distance$\times F$ number;

FIG. 2 is a schematic diagram in vertical section taken at the lens shutter portion along the plane parallel to the lens axis and showing an embodiment of the present invention;

FIG. 3 is a diagram illustrating the principle of the structure of the present invention; and FIG. 4 is an electric circuit diagram showing an embodiment in which the electrical warning indication is effected by utilizng the circut of the exposure meter.

DESCRIPTION OF THE PREFERRED EMBODIMENTS

Referrng to FIGS. 2 and 3, indicated at 1 is a distance adjusting ring which is adapted to be rotated about the lens axis integrally with a distance cam 2 and which, when rotated, effects setting of the distance through the distance cam 2. Designated at 3 is a guide number changing member by which the guide number is changed in accordance with the type of the flashbulb or electronic flash. When the distance adjusting ring 1 is rotated by the operator to focus the lens on the subject, the diaphragm aperture adjustment will be made automatically by means associated therewith on the basis of the relationship of guide number$=F$ number$\times$distance or the aperture will be adjusted to a setting position determined from the distance upon calculation. Designated at 4 is a holder which is rotatable integrally with the guide number changing member 3. Such structure is incorporated in any camera provided with means for flash photography.

The present invention comprises an electrically conductive member 5, a movable contact member 6 in mating relationship therewith, a power source E and an electrical member L for indicating a warning electrically connected to these members 5, 6 through lead wires 9. The conductive member 5 is made of a suitable electrically conductive plate and fixed to the holder 4 which is adapted to rotate together with the guide number changing member 3. A stationary contact member 7 is fixed to a fixed member such as shutter case 10 or lens frame 11 and is always kept in sliding contact with the conductive member 5 over the entire rotatable range of the guide number changing member 3 so as to effect electrical connection between the conductive member 5 and the stationary contact member 7 all the time. As shown in FIG. 3, for instance, the conductive member 5 is formed with a stepped portion 5a so that, in the vicinity of the already described distance limit, the conductive member 5 may be brought into contact with and electrical connection with the movable member 6 mounted on the distance cam 2 and adapted to be rotated together with the cam 2. The movable contact member 6 and stationary contact member 7 are electrically connected to a switch SW, lamp L and power source E by respective lead wires 9 to form an electric circuit for turning on or off the lamp L. The switch SW is a circuit switch which is closed when the camera is made ready for flash photography and which is opened when an operation to complete flash photography is made.

In FIG. 3, when the distance cam 2 is turned in the direction of arrow A together with the distance adjusting ring 1 or when the holder 4 which moves together with the guide number changing member 3 is turned in the direction of arrow B, with the switch SW in closed position, the distance between the movable contact member 6 and the stepped portion 5a of the conductive member 5 is reduced until the contact 6 and the member 5 are brought into contact with each other to close the electric circuit and turn on the lamp L.

When the movable contact member 6 and the conductive member 5 in contact with each other are respectively rotated by the cam 2 and holder 4 in the directions opposite to those indicated by the arrows A and B, they are disengaged from each other to open the electric circuit and turn off the lamp L, further rotation causing the contact member 6 and the stepped portion 5a of conductive surface 5 to move away from each other.

With reference to FIG. 3, the operation to provide the distance limit indication for flash photography will be explained with respect to a camera having the minimum diaphragm aperture of F/22. When the guide number scale on the holder 4 is set to a fixed mark 3a at a guide number of 20 by operating the guide number changing member 3 and distance adjustment is made, the distance cam 2 is rotated and a mark 2a indicates the distance thus adjusted. Supposing that the mark 2a on the distance cam 2 points to 0.9 m., the movable contact member is brought very close to, but not into contact with, the stepped portion 5a of the conductive member 5, because as apparent in FIG. 1 the distance 0.9 m. is still within the adjustable range of the diaphragm aperture for flash photography at the guide number of 20.

In the same manner, if the guide number changing member 3 is operated to bring the guide number of 28 into alignment with the fixed mark 3a and the distance cam 2 is moved in the direction of the arrow A, the movable contact member 6 is brought proximate to the stepped portion 5a of the conductive member 5 at the position where the mark 2a points to 1.25 m. and at a position between 1.25 m. and 0.9 m. (in the vicinity of 1.2 m.) the movable contact member 6 comes into contact with the conductive member 5 to close the electric circuit and turn on the lamp L for warning.

Further in case where the guide number is set at 40, the movable contact member 6 is brought into contact with the conductive member 5 immediately after the mark 2a points to 1.77 m. (around 1.7 m.) to close the electric circuit; the guide number, if set to 56, effects the contact between the contact member 6 and the conductive member 5 immediately after the mark 2a indicates 2.5 m.; and with the guide number of 80, the contact takes place immediately after the mark 2a indicates 3.54 m. to turn on the lamp L in respective instances.

Since the diaphragm can not be stopped down further beyond the stop of F/22 if this is the minimum diaphragm aperture of the camera, the distance to the subject, while the lamp L is on, is too small and the exposure value is consequently higher than the proper value. It is therefore impossible to obtain proper exposure. In case of a camera having the minimum diaphragm aperture of F/16, it will be seen in FIG. 1 that the distance limits are 0.88 m. at the guide number of 14, 1.25 m. at the guide number of 20, 1.77 m. at the guide number of 28.

FIG. 4 illustrates the circuit diagram of an exposure meter employing CdS which is utilized as the warning indicating means in place of the lamp L. The exposure meter M is provided with a by-pass circuit and the circuit change is effected by a change-over switch SW. The CdS is connected to the meter M for usual exposure measuring operation, while for flash photography the by-pass circuit is inserted into the circuit of the meter M by operating the change-over switch SW. The switching contacts 5' and 6' in the by-pass circuit are respectively connected to the conductive member 5 and the movable contact member 6.

With this structure, when the contacts 5', 6' are closed, namely when the conductive member 5 and the movable contact member 6 are brought into contact with each other, hardly any current passes through the meter M, with the result that the pointer of the meter is deflected to the position where the current reading is zero. Thus, the time when the meter pointer is brought to the position of the reading of zero corresponds to the time when the lamp L in FIGS. 2 and 3 is turned on, the distance limit thus being detected. Designated at $R_1$ in FIG. 4 is a resistor for adjusting the meter pointer to the predetermined position while the contacts 5' and 6' are held open in flash photography.

Although the electric circuit for giving the warning comprises the lamp L or meter M in the foregoing embodiments, some other appropriate indication means may be employed in the circuit.

Since highly accurate determination of the distance limit is not necessarily required for flash photography, the point where the conductive member and the contact member are brought into contact with each other may be set at an appropriate position in the vicinity of the distance limit.

While the foregoing description has been made with respect to the indicating system as it is applied to the cases where the diaphragm aperture can not be stopped down smaller than F/22, the warning system can of course be utilized in a camera which has the maximum diaphragm aperture of F/1.4 in case where the F number given by the relation, guide number=F number×distance, is likely to be such a value as 1.2 or 1.0.

What is claimed is:

1. A system for indicating the distance limit for flash photography comprising an adjustable member providing a guide number indication; a distance adjusting member movable independently of said guide number indicating member; a switch including an electric conductive surface affixed to, movable with and extending along one of said adjustable members and an electric contact disposed on the other of said adjustable members and in constant slideable engagement with said one adjustable member and movable with said other adjustable member into and out of sliding engagement with said conductive surface in response to the relative positions of said members to effect engagement between said contact and said conductive surface and the closing of said switch in the vicinity of a distance limit of flash photography as reflected by the relative positions of said members; an electrical indicating device, and circuit means responsive to the state of said switch for actuating said indicating device.

2. The system of claim 1 wherein said indicating device comprises an electric meter, and said circuit means comprises a voltage source, a photoconductor, and means including a second switch for alternatively connecting said photoconductor in series with said voltage source across said meter or said first-mentioned switch across said meter.

3. The system of claim 1 wherein said indicating device comprises a lamp.

4. The system of claim 1 wherein said adjusting members comprise coaxial rotatable rings, said conductive surface extending along an arcuate path coaxial with said rings and including an insulating surface in end-to-end relationship with said conductive surface and lying in the plane thereof.

References Cited

UNITED STATES PATENTS

| | | | |
|---|---|---|---|
| 3,296,947 | 1/1967 | Engelsmann et al. | 95—1 |
| 3,392,643 | 7/1968 | Rentschler | 95—10 |
| 3,434,404 | 3/1969 | Kobayashi et al. | 95—10 |

SAMUEL S. MATTHEWS, Primary Examiner

F. L. BRAUN, Assistant Examiner

U.S. Cl. X.R.

95—10 C, 64 A